United States Patent [19]

Hattori et al.

[11] 4,429,320

[45] * Jan. 31, 1984

[54] INK JET RECORDING APPARATUS

[75] Inventors: Yoshihumi Hattori, Kawasaki; Koji Terasawa, Fuchu; Yukio Kasugayama, Yokohama, all of Japan

[73] Assignee: Canon Kabushiki Kaisha, Tokyo, Japan

[ * ] Notice: The portion of the term of this patent subsequent to Jul. 27, 1999 has been disclaimed.

[21] Appl. No.: 188,053

[22] Filed: Sep. 17, 1980

[30] Foreign Application Priority Data

Sep. 21, 1979 [JP] Japan ................................ 54-120692
Sep. 21, 1979 [JP] Japan ................................ 54-120693

[51] Int. Cl.[3] ............................................ G01D 15/16
[52] U.S. Cl. ................................................ 346/140 R
[58] Field of Search ............... 346/140 R, 75, 140 PD

[56] References Cited

U.S. PATENT DOCUMENTS 3,771,165 11/1973 Kurimoto et al. .............. 346/140 R
4,178,595 12/1979 Jinnai et al. .................. 346/140 PD
4,342,041 7/1982 Kasugayama et al. ......... 346/140 R

FOREIGN PATENT DOCUMENTS 2450463 5/1976 Fed. Rep. of Germany ... 346/140 R
2709730 9/1978 Fed. Rep. of Germany ...... 346/104 PD
54-151033 11/1979 Japan ........................... 346/140 PD

*Primary Examiner*—Gene Z. Rubinson
*Assistant Examiner*—W. J. Brady
*Attorney, Agent, or Firm*—Fitzpatrick, Cella, Harper & Scinto

[57] ABSTRACT

An ink jet type recording apparatus is disclosed which comprises a carriage slide movable along a shaft, a recording head for jetting recording liquid in response to an electric signal, a subsidiary container for supplying the recording liquid to the recording head and a main container connected with the subsidiary container through a flexible supply line. The subsidiary container and recording head are mounted on the carriage. Supply of the recording liquid to the subsidiary container from the main container is carried out making use of the space under the shaft along which the carriage is slide moved.

7 Claims, 11 Drawing Figures

INK JET RECORDING APPARATUS

BACKGROUND OF THE INVENTION

1. Field of the Invention

The present invention relates to an ink jet type recording apparatus and more particularly the present invention is directed to miniaturization of such type of recording apparatus.

2. Description of the Prior Art

A typical arrangement of the ink jet recording apparatus having an open ink supply system according to the prior art is shown in FIG. 1.

In FIG. 1, the reference numeral 1 designates a recording head which is formed by using, for example, piezo-electric element. A tank 3 containing an amount of recording liquid 4 (hereinafter simply referred to also as "ink") is connected to the recording head 1 through a supply line 2 to supply the ink 4 to the recording head 1. The tank 3 has a vent hole 5 provided in its upper wall to keep the pressure within the tank at atmospheric pressure. The ink 4 contained in the tank always reaches the tip end of the recording head 1. In response to an electric signal applied to the piezo-electric element of the head 1, the ink is jetted from the tip end of the head, namely from the jet orifice 1A as droplets 6 to effect printing of character, mark etc. on a recording paper. Since there is held a certain proper level difference between the recording liquid in the tank 3 and the recording head 1, the ink consumed as droplets 6 is automatically supplemented to the recording head from the tank through the supply line 2 mainly by the surface tension at the orifice 1A. Therefore, the jet orifice 1A always has a sufficient amount of ink 4 reaching the orifice.

The above mentioned type of ink jet recording apparatus is often incorporated into a portable table computer or typewriter. In this case some problems arise as follows.

As shown in the above, the tank 3 and the recording head 1 are arranged spaced from each other some distance. If the portable calculator or typewriter in which the ink jet recording apparatus has been incorporated is inclined when a man is carrying it, then the level difference between the ink within the tank 3 and that in the orifice 1A can not be kept properly. The meniscus of ink formed at the orifice 1A moves back into the supply line 2 or the ink flows over out of the orifice 1A. In the former case it is required to restore the retrograded mechanics to its original position by using suitable means, for example, by applying a pressure to the ink from the tank side. In the latter case, the flowed ink will make the body of the apparatus dirty. In any case, it troubles the operator very much.

The above mentioned troubles are enhanced by oscillation and/or impact applied to the apparatus. If oscillation or impact is occasionally applied to the main body of apparatus, recording head 1 or supply line 2 or when the recording head 1 runs against the end of print part at a high speed, the meniscus at the orifice 1A is easily broken which results in leaking of ink or retrogradation of ink into the supply line 2. On this occasion, if the level difference between the tank and recording head is at an improper value, it becomes difficult to restore the once broken meniscus to its original position. The ink will continue flowing out of the orifice or the meniscus will further retrograde into the supply line 2. Generation of oscillation and impact force is inevitable for those apparatus in which printing is effected by moving a recording head 1 forward and backward relative to a recording medium such as a recording paper. Under the condition in which the level difference between the recording liquid in the tank 3 and that in the orifice 1A is not at a proper value, the recording head 1 becomes much more sensitive to such oscillation and impact. This is a fatal drawback of the apparatus. For this reason, the reciprocating speed of recording head was limited and therefore high speed printing was difficult to attain.

Another important problem involved in the above mentioned ink jet type of recording apparatus is caused by air bubbles occasionally introduced into the supply line. So long as bubbles are present confined in the supply line 2, no particular trouble will be caused thereby in respect of the function of ink jetting from the orifice. However, when such air bubbles move with the recording liquid through the supply line and enter the recording head 1, the jetting of ink is disturbed by the bubbles. The trouble becomes much more serious in particular when deformation of an electrical-mechanical converter is used as the jet driving source at the recording head 1. In this case, energy generated by the deformation of the electrical-mechanical converter is absorbed by such air bubbles so that transmission of the energy to the recording liquid is hindered. In the worst case, jetting of ink from the recording head is completely stopped thereby and no continuous and stable printing is possible.

To solve the above problems involved in the known ink jet recording apparatus having an open ink feed system, we, the applicant of the present application have already proposed an improved ink jet recording apparatus which is the subject of our prior application, Japanese Patent Application No. 10,189/1979.

FIGS. 2A and B schematically show an example of the improved ink jet recording apparatus.

In FIG. 2, a recording head designated by 10 and an ink tank designated by 11 are united together to form a container 12. The container 12 is fixedly mounted on a carriage 13 which is in turn mounted on a shaft 14 slidably along the shaft. To effect printing on a printing paper, the carriage 13 is moved in the direction across the printing paper. The recording head 10 is constituted of piezo-electric element 15, nozzle part 16, jet orifice 17 and supply tube 18. The supply tube is so bended as to describe an L and extends from the body of the head 10 into the tank 11. Recording liquid (ink) 19 contained in the tank 11 is fed to the recording head 10 through the supply line 18. In this connection, it should be noted that the supply tube 18 is fixed to a wall 20 disposed covering the container 12 so that the supply tube can not be moved by oscillation or impact occasionally applied thereto. The tank 11 has a vent hole 21 to keep the pressure in the tank at atmospheric level. To externally apply electric signals to the piezo-electric element 15 there are provided connectors 22 and 23 connected to the element 15 through signal lines not shown. The apparatus is designed in the manner that the distance between the jet orifice 17 and the free end 18A of the supply tube is adjustable to a suitable value.

The arrangement of ink jet recording apparatus described above has advantages over the aforementioned known apparatus. The recording head 10 and the ink tank 11 are united together to form a container 12 fixedly mounted on a carriage 13. The supply tube 18 having an optimum length for supplying the ink to the recording head is inserted into the tank 11. In the apparatus, no trouble of ink leak from the head 10 or retrogradation of the meniscus into the supply tube 18 can be caused by inclination, oscillation or impact as mentioned above.

However, it has been found that the improved apparatus still has some problems which will be described hereinafter.

For a miniature calculator or other similar apparatus the speed of printing is required to be as high as possible. To satisfy the requirement, the weight of the reciprocating carriage has to be reduced as much as possible taking into consideration the performance of the motor useful for driving the carriage. To reduce the weight load of the carriage the amount of recording liquid to be contained in the ink tank must be limited. The amount of ink actually used in a printer is very small. As an example, in case of a printer of the type in which one character is formed by 5×7 dot matrix, it has been experimentally shown that 1 cc of ink is sufficient to print 150-200 thousand characters using a jet orifice having an inner diameter ranging from 50 to 100 $\mu$m. Therefore, it may said that if a tank having a capacity of about 3 cc is used as the tank 11, then the electronic instrument provided with the ink jet printing apparatus such as a table calculator with printer can be used for a long time without need of ink supply or tank exchange. However, in a table calculator or in other similar electronic equipment, some problem arises from the ink supply or tank exchange however small the frequency of ink supply or tank exchange may be. It may be possible to set the capacity of tank to such value for which the supply of ink or exchange of the tank is required only one time per half a year. Also, it may be possible to simplify the mechanism necessary for supplying the ink or exchanging the tank to the extent that the work required to supply the ink or exchange the tank is very easy for the operator. However, even under the provision there may be caused some trouble by the supplement or exchange work. It is also a problem that the weight load applied to the carriage by the tank changes with time. In case of 3 cc capacity of tank, the change of weight load reaches about 3 g when the weight of tank full of ink and that of vacant tank are compared. With this change in weight, the carriage driving speed and therefore printing speed also change. This is true in particular when a linear motor is used as the carriage driving motor. Since the printing speed changes with time, it is difficult to maintain the print quality at a desired level.

We, the applicant of the present application have proposed a solution to the above problem in our prior application, Japanese Patent Application No. 103,188/1979 which is the priority application for U.S. application Ser. No. 173,999, filed July 31, 1980, now U.S. Pat. No. 4,342,041, issued July 27, 1982. FIG. 3 schematically shows an ink jet recording apparatus with an ink feeding system operable with pump action as disclosed in the prior application.

In FIG. 3, a recording head is designated by 32 and a subsidiary tank by 33. The head 32 and subsidiary tank 33 are united together to form a head/tank unit 31. The head/tank unit 31 is mounted on a carriage 34 which is in turn mounted on a shaft 35 slide movably along the shaft. The carriage 34 is driven by a motor (not shown). At the lower part of one side wall of the subsidiary tank 33 there is provided an ink inlet 36 with which a flexible supply line is connected. The supply line 37 is connected to another supply line 39 through a fixed point 38. The supply line 39 is connected with an ink outlet 41 provided at the lower portion of one side wall of a main tank 40. Vent holes 42 and 43 are provided on the upper walls of the subsidiary tank 33 and main tank 40 respectively to keep the pressure in the tanks at atmospheric.

The manner of operation of the apparatus shown in FIG. 3 is as follows:

A print signal is applied to the recording head 32 in the manner known per se. In response to the signal the recording head 32 jets ink droplets toward a printing paper (not shown) and also the carriage 34 carrying thereon the head/tank unit 31 is driven by the carriage driving motor (not shown) which is controlled also by the same print signal. As the carriage 34 is driven moving along the shaft 35 in accordance with the print signal, desired character, numeral or mark is printed on the printing paper.

As shown in FIG. 4, the flexible ink supply line 37 swing moves in such manner as to describe an arc about the fixed point 38 as its center when the carriage 34 with the head/tank unit 31 moves leftward and rightward along the shaft 35. Owing to the swing motion of the flexible supply line 37 connected to the head/tank unit there is produced a centrifugal force, that is, a pump action to feed ink to the recording head. Thus, ink is effectively supplied from the main tank 40 to the subsidiary tank 35 in which the ink is gradually decreased by printing.

For the ink jet recording apparatus shown in FIGS. 3 and 4, the pump pressure in the ink supply line extending from the main tank to the subsidiary tank can be found mathematically in the following manner:

For the purpose of illustration, description will be made with reference to FIG. 5 in which the subsidiary tank of the head/tank unit 31 and the main tank 40 are shown to be connected to each other directly by the supply line 37 without any intermediate fixed point.

The head/tank unit 31 moves along the shaft 35 at an angular velocity $\omega$ (speed Vl). The length of the supply line 37 measured from the main tank 40 to the head/tank unit 31 is l. The cross-sectional area of the supply line 37 is S. The specific weight of the ink is $\rho$, its gravitational acceleration is g and the speed of the supply line 37 at a distance r from the wall of main tank 40 is Vr.

Under the above conditions, let F denote the force produced by a pressure difference dp between the front side and backside of a minute area dr of the supply line 37 at the distance r and f the centrifugal force produced by the swing motion of the supply line 37 about the main tank 40 and acting on the ink. Then F=f.

On the other hand, F, that is, the force applied to the ink by the pressure difference dp can be represented by the following equation:

$$F = S\left(P + \frac{dP}{dr}\,dr\right) - SP \quad (1)$$

$$= S \cdot \frac{dP}{dr}\,dr$$

Also, the centrifugal force f can be represented by $$f = \frac{S\rho dr}{g} \cdot \omega^2 r \quad (2)$$

From F=f, $$S \cdot \frac{dP}{dr} dr = \frac{S\rho dr}{g} \cdot \omega^2 r \quad (3)$$

Therefore, the pressure P can be found by the equation, $$P = \frac{\rho}{2g} \cdot \omega^2 r^2 = \frac{\rho}{2g} \cdot Vr^2 \quad (4)$$

Let P be the pump pressure. Then it will be understood that the pump pressure P is proportional to the square of carriage speed Vl. Thus, every time when the carriage 34 is moved, the recording liquid in the supply line 37 is subjected to a centrifugal force which depends upon the running speed of the carriage. The centrifugal force produces a pumping action to effectively supply the recording liquid to the subsidiary tank 33 from the main tank 40. Therefore, high speed printing can be realized by driving the carriage at a sufficiently high speed enough to overcome the force against ink feed (which is, for example, a composite resistance force formed by the inner diameter and material of the supply line, filter etc.).

As previously noted, the head/tank unit 31 is desired to be light in weight and small in size to attain high speed printing. A preferred arrangement of head/tank unit 31 to satisfy the requirements is shown in FIG. 6.

In FIG. 6, a recording head generally designated by 50 is constituted of piezo-electric element 51, nozzle part 52, jet orifice 53 and supply tube 54. Designated by 55 is a subsidiary tank having a projection 55A. The projection 55A is formed by extending one side wall of the subsidiary tank (the left-hand side wall thereof as viewed in the drawing of FIG. 6) and bending the extension at right angles approximately in line with the upper surface of the subsidiary tank. With the under surface of the projection 55A, it is fixed to the carriage 34. The recording head 50 is fixedly mounted on the projection 55A. Therefore, in this arrangement, the carriage 34 carries the recording head 50 on its upper surface and the subsidiary 55 on its side surface. Compared with the arrangement shown in FIG. 2, it is evident that the arrangement shown in FIG. 6 is smaller in size, lighter in weight and thinner in shape and therefore preferred. Again, vent hole 56 is provided in the upper wall of the subsidiary tank to keep the interior of the tank in communication to the atmosphere. The upper wall of the subsidiary tank 55 may be formed by polyethylene, fluororesin or silicone resin in the form of plate provided therein a number of openings having an inner diameter less than 100 μm serving as the vent hole 56. Also, a membrane filter may be used to form the upper wall of the tank 55.

The subsidiary tank 55 has an ink inlet 57 provided at the lower portion of its one side wall (the right-hand side wall as viewed in the drawing). A supply line 37 is connected to the ink inlet 57 to supply ink to the tank 55.

Since the arrangement shown in FIG. 6 is basically the same as that shown in FIG. 2, the recording head 50 is insensitive to inclination, oscillation and shock. Troubles of ink leak from the head tip and retrogradation of meniscus as previously mentioned can be prevented completely. In addition, the head/tank unit shown in FIG. 6 is smaller in size, lighter in weight and thinner in form than that in shown in FIG. 2

Even when air bubbles are introduced into the supply lines 37 and 39, no trouble can be caused thereby. In the conventional apparatus shown in FIG. 1, such air bubbles can enter directly the recording head. In the improved apparatus shown in FIGS. 2 and 6, however, no bubble is allowed to directly enter the head. In the case of the apparatus shown in FIG. 6, such air bubbles will enter the subsidiary tank 55. Since the tank 55 is provided with a vent filter 56, the bubbles once entered the tank 55 will disappear there and no bubble can enter the recording head 50. Therefore, there is no fear of the jet orifice 53 being blocked by air bubbles. Stable printing is assured. Furthermore, since the subsidiary tank serves also as a buffer to the pump pressure, there is no fear of the ink being flown over out of the orifice. This makes it possible to drive the carriage at a higher speed than in the conventional apparatus shown in FIG. 1.

As seen from FIGS. 3 and 4, the recording apparatus in which ink supply to the subsidiary tank is carried out by means of pump action, has another advantage that the bottom level of the main tank 40 can be positioned lower than the bottom level of the subsidiary tank 33.

All the improvements in ink jet recording apparatus already proposed by our prior applications and described in detail in the above are primarily directed to the prevention of ink leak which often occurs when a man carrys electronic equipment with a printer such as a table calculator with printer in which an ink jet type recording apparatus is incorporated. While the above mentioned improvements are worthy of appreciation, there is another problem to be solved regarding the ink jet recording apparatus. When an ink jet recording apparatus is used as a printer to be mounted in miniature electronic equipment, the apparatus is required to have a compact form as small as possible considering the available space. Hitherto, the location for mounting the main tank has been limited severely because of its positional relation to the recording head. This limitation has constituted an obstacle to further miniaturization of the apparatus.

In the conventional ink jet recording apparatus shown in FIG. 1, the recording liquid is supplied to the recording head 1 from the main tank 3 by the surface tension at the orifice 1A of the head 1. This means that the main tank 3 should be located at a level higher than the recording head 1. Under the condition, it is very difficult to miniaturize the ink jet recording apparatus.

SUMMARY OF THE INVENTION

Accordingly, it is an object of the present invention to provide a miniaturized ink jet recording apparatus.

It is another object of the invention to provide such ink jet recording apparatus which is operable using a pump pressure ink feed system.

It is a further object of the invention to provide such ink jet recording apparatus in which a main ink container having a flattened form is disposed under a printer unit.

It is still a further object of the invention to provide such ink jet recording apparatus in which the space between a platen and a rolled paper charging part is fully and effectively made use of.

Other and further objects, features and advantages of the invention will appear more fully from the following description of embodiments with reference to the accompanying drawings.

DESCRIPTION OF PREFERRED EMBODIMENTS

Figure 1:
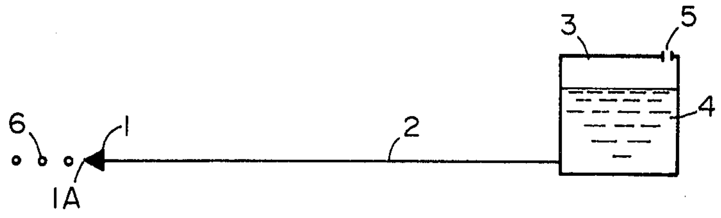
FIG. 1 schematically shows the conventional arrangement of ink jet recording apparatus.
Figure 2A:
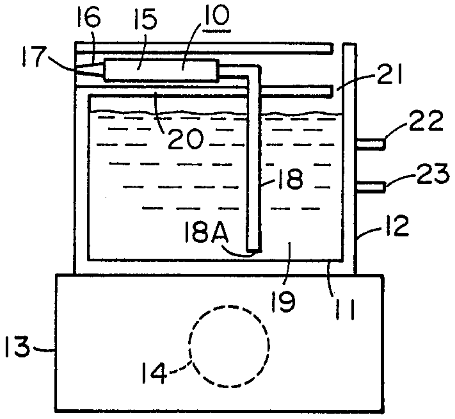
FIGS. 2A, 2B, 3, and 4 illustrate an improved arrangement of jet recording apparatus already proposed.
Figure 2B:
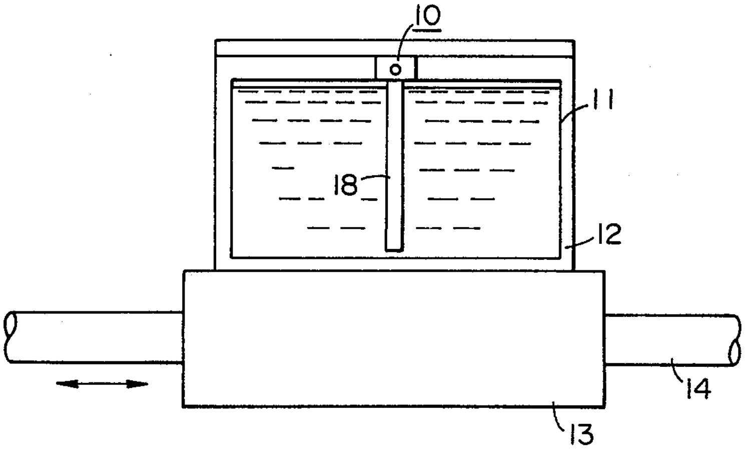
Figure 3:
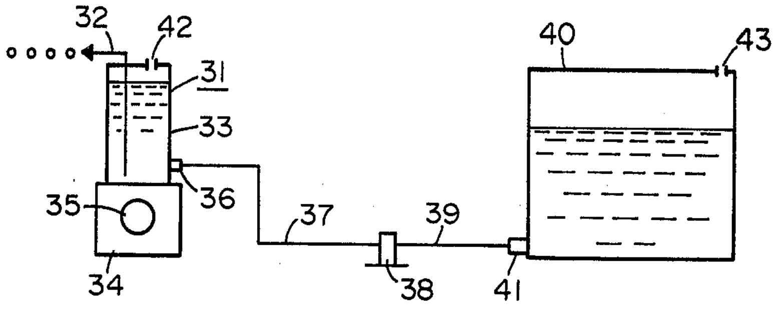
Figure 4:
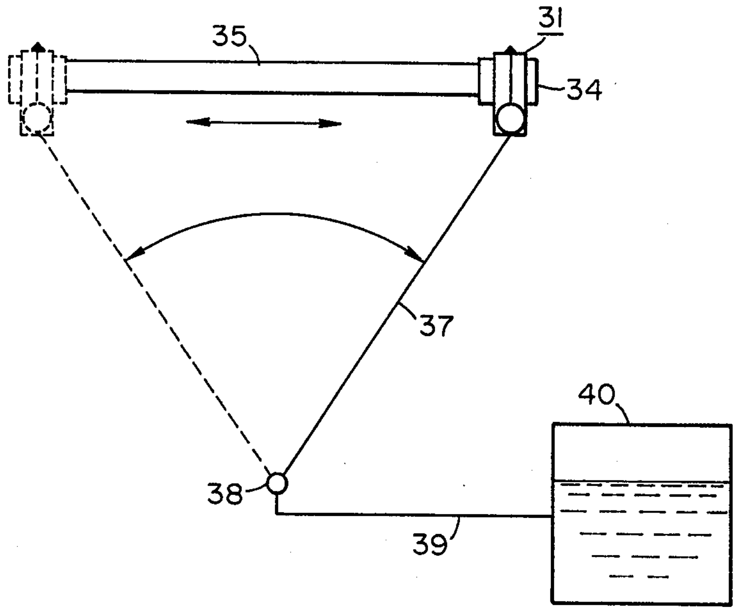
Figure 5:
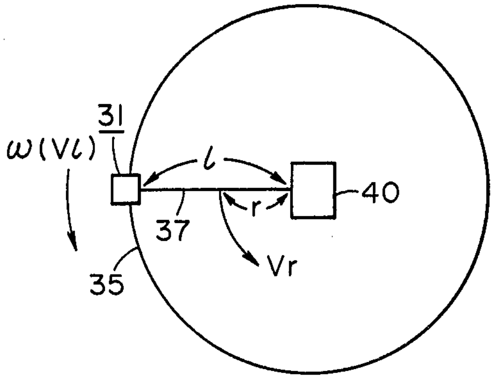
FIG. 5 is a diagrammatic view for illustrating the manner of operation of the apparatus shown in FIGS. 3 and 4.
Figure 6:
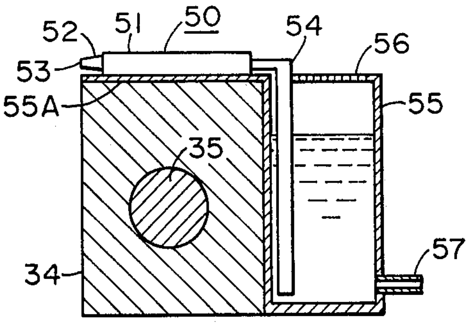
FIG. 6 shows an form of head/tank unit.
Figure 7:
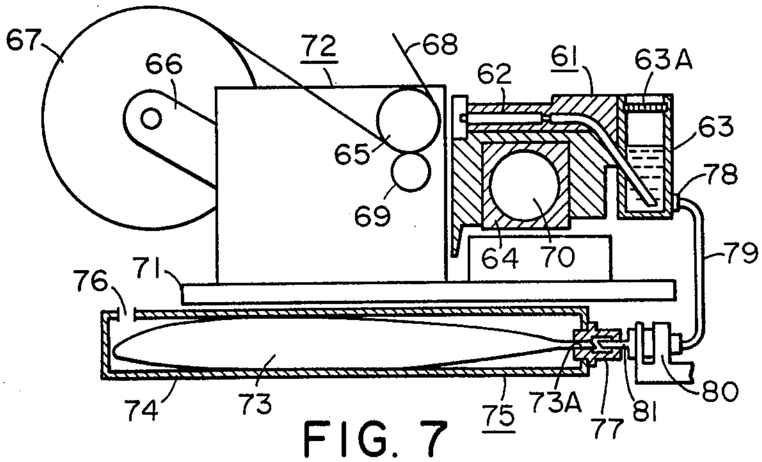
FIG. 7 shows an embodiment of the present invention.

Referring to FIG. 7 showing an embodiment of the present invention, the ink jet recording apparatus includes a recording head 62 and subsidiary tank 63 which are united together to form a head/tank unit 61. The head/tank unit is mounted on a carriage 64. At the upper portion of the subsidiary tank 63 there are provided air vents 63A (ventilation filter) to keep the pressure within the tank at atmospheric level. Designated by 65 is a platen disposed facing the recording head 62. A roll of paper 67 is charged on a rolled paper charge part 66 and the leading end 68 of paper web unrolled from the roll 67 is fed to the platen 65 passing through the nip between the platen and a pinch roller 69.

The carriage 64 is slide movably mounted on a shaft 70 and a carriage driving motor (not shown) drives the carriage to move it forward and backward along the shaft 70 in a controlled manner. All of the above mentioned members are mounted on a base 71 to form together a printer unit 72. Disposed under the base 71 is a main tank which is formed as an ink cassette 75. The ink cassette 75 is detachable and comprises a bag-like ink container 73 and a flat type casing 74 containing therein the bag-like container. The ink cassette 75 has an air vent 76 to keep the interior of the cassette in communication to atmosphere. The cassette has also an ink outlet 77 fitted to one side wall thereof (the right-hand side wall as viewed on the drawing). The ink outlet 77 removably holds the bag-like container 73 at 73A where the neck portion of the container is connected with the outlet.

On the other hand, the subsidiary tank 63 has an ink inlet 78 provided on the lower portion of one side wall of the tank. A flexible supply line 79 is connected to the inlet 78. The other end of the flexible supply line 79 is connected to a tank connected part 80 provided on the main body of an electronic equipment in which the ink jet recording apparatus is incorporated as its printer part. At the other end the tank connection part 80 has a needle 81 which is pushed into the above-mentioned ink outlet 77 formed of elastic material. By inserting the needle 81 into the ink outlet 77 in this manner there is obtained a connection between supply line 79 and ink cassette 75 as shown in FIG. 7.

The manner of operation of the ink jet recording apparatus shown in FIG. 7 is as follows:

A print signal is applied to the recording head 62 in the manner known per se. In response to the signal, the head 62 jets ink droplets toward the recording paper 67. At the same time, the carriage driving motor (not shown) is controlled by the same print signal to drive the carriage 64 with the head/tank unit 61. Thus, the carriage 64 moves along the shaft 70 to effect printing on the recording paper 67. Since the head/tank unit 61 moves rightward and leftward along the shaft 70 during printing and the ink supply line 79 is connected with the unit 61, the supply line 79 moves in a manner of swing motion with the translational motion of the head/tank unit 61. Therefore, as previously described, a centrifugal force is exerted on the ink in the supply line 79 and thereby there is produced a pump action to supply the ink to the subsidiary tank 63. In this manner, although the bag-like container 73 serving as a main tank is disposed lower than the liquid level in the subsidiary tank 63, an effective ink supply to the subsidiary tank from the container 73 is carried out automatically with the decrease of ink in the tank 63 by printing.

In the ink jet recording apparatus according to the invention, therefore, no particular limitation is imposed on the positional relation between the main tank (bag-like container 73) and the recording head 62. The flat bag-like container 73 serving as a main tank is allowed to be located in a place lower than the subsidiary tank 63 as shown in the above embodiment provided that the positional relation between the recording head and the subsidiary tank should be suitably determined taking into consideration the suction force to the ink by surface tension at the recording head 63.

The flattened bag-like container shown in the above embodiment is a closed container having no vent hole. To supply ink to the recording head where ink is consumed by printing, the bag-like container is required to be deformable following the decrease in volume of ink contained therein. To this end, the bag-like container is made of such material which is easily deformable and high in flexibility. For example, it is made of flexible film or laminated film of nylon, polyethylene and other high molecular compound. However, even when such flexible material is used to make the container, the above mentioned requirements of deformability and high flexibility can be satisfied only by using a film having a thickness less than 200 μm.

Generally speaking, the gas permeability and moisture permeability of high molecular film increase with increase of flexibility and with decrease of thickness of the film. If a bag-like container is made of such thin film of 200 μm or less in thickness, the container can not perfectly prevent the evaporation of solvent such as water or glycol constituting an ingredient of the ink contained in the container. On the other hand, there is a possibility that any toxic gas contained in the atmosphere may penetrate into the container. In any case, such phenomenon results in change of the composition of ink which has an adverse effect on the ink jetting ability and/or the print (image) making ability.

Figure 8A:
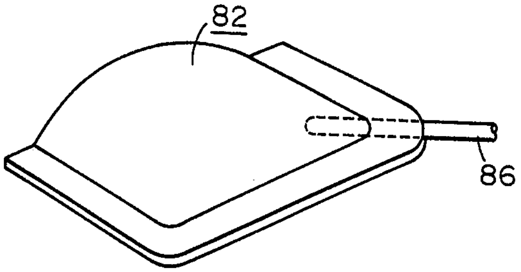
FIG. 8A is a perspective view of a bag type container used in the invention.

In view of the above respects, it is preferred to form the flat bag-like container as a three-layer structure as shown in FIG. 8.

Figure 8B:
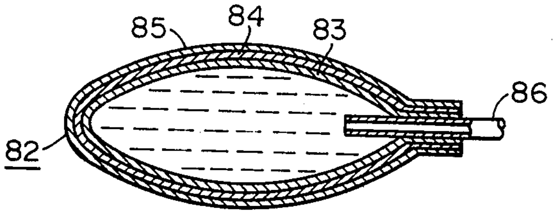
FIG. 8B is a sectional view thereof.

In FIG. 8B, the bag-like container generally designated by 82 is formed by a laminated film comprising a high molecular film layer 83, a metal thin layer 84 overlaid on the high molecular film layer 83 and a high molecular film layer 85 covering the metal layer 84. The inside high molecular film layer 83 may be, for example, a layer of polyethylene film. As the metal intermediate layer 84, there may be used, for example, a thin layer of aluminum which may be applied on the polyethylene film layer 83 by bonding or vapour deposition. The outside high molecular film layer 85 may be a film of nylon. The nylon film layer 85 may be applied onto the metal layer 84 by any suitable means such as bonding. An ink outlet tube 86 is inserted into the bag-like container 82 of the above described three layer structure.

The container of three-layer structure shown in FIG. 8 and a container of two-layer structure comprising only high molecular film layers were compared in respect of gas- and moisture permeability and weight loss (%) of the content. The weight loss was measured after leaving the container standing for a month at 60° C. subsequent to filling the container with recording liquid. The following table shows the results:

TABLE 1

| Materials used to form the bag-like container | | | Moisture permeability $g/m^2 \cdot 24$ hr. | Gas ($O_2$) permeability $cc/m^2 \cdot 24$ hr.-atm | Weight loss % |
|---|---|---|---|---|---|
| inside layer polyethylene | outside layer nylon | | 9~10 | 50~70 | 19.0 |
| inside layer 83 polyethylene | intermediate layer 84 aluminum | outside layer 85 nylon | 0 | 0 | 0.007 |

Table 1 shows that the flat bag-like container comprising a thin metal film layer overlaid on a high molecular film is zero in moisture permeability and gas permeability and also substantially zero in weight loss. This means that the content (ink) in the container is subjected to no change of composition, which gives an advantage over the container made of a laminate comprising only high molecular film layers.

As understood from the foregoing, the ink jet recording apparatus according to the above embodiment of the invention brings forth many advantages.

Since a flat shaped main tank is arranged under a printer unit including a recording head, platen etc., it is made possible to reduce the total height and depth of the recording apparatus. Such a small size ink jet recording apparatus is very suitable for a portable electronic equipment such as a miniature table computer with printer.

Since the flat shaped ink container is easily detachable, a speed-up of main tank exchange can be attained. In addition, by covering the surface of the flat bag-like container with a thin metal layer in accordance with a preferred embodiment of the invention, the moisture permeability and gas permeability thereof can be reduced to zero, which assures that the recording liquid contained in the container can remain unchanged in quality for a long time.

Figure 9:
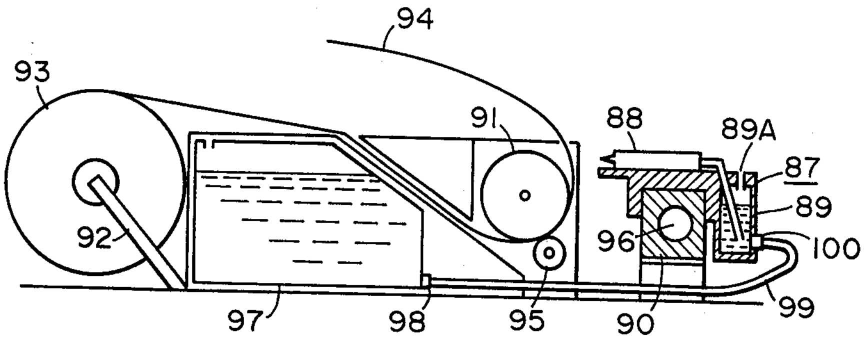
FIG. 9 shows another embodiment of the invention.

FIG. 9 shows another embodiment of the ink jet recording apparatus according to the invention.

In FIG. 9, a recording head 88 and a subsidiary tank 89 are united together to form a head/tank unit 87. The unit 87 is mounted on a carriage 90. The subsidiary tank 89 has air vents 89A (ventilation filter) provided at the upper part of the tank to communicate the inner pressure of the tank to atmospheric pressure. Designated by 91 is a platen disposed opposed to the recording head 88. A roll of paper 93 is charged on a rolled paper charge part 92 and the leading end 94 of web unrolled from the roll of paper 93 is guided to the platen 91 passing through the nip between the platen and a pinch roller 95.

The carriage 90 is mounted on a shaft 96 slide movably along the shaft and moves forward and backward under the control of a carriage driving motor (not shown). A main tank 97 is disposed between the platen 91 and the roll charge part 92 and under the running path of the printing paper web. The main tank 97 has an ink outlet 98 provided at the lower part of one side wall (the right-hand side wall as viewed on the drawing) of the tank. One end of a flexible supply line 99 is connected to the ink outlet 98. The other end of the supply line is connected to an ink inlet 100 provided at the lower part of one side wall (the right-hand side wall as viewed on the drawing) of the subsidiary tank 89.

The manner of operation of the ink jet recording apparatus shown in FIG. 9 is as follows:

A print signal is applied to the recording head 88 in a manner known per se. In response to the signal, the head 88 jets droplets of ink toward the printing paper 93 and also the carriage driving motor (not shown) is controlled to move the carriage 90 with the head/tank unit 87 along the shaft 96. Thus, a desired character, numeral or symbol is printed on the recording paper 93.

Since the supply line 99 is connected with the head/tank unit 87 moving along the shaft leftward and rightward, the supply line 99 moves in a manner of swing motion with the translational movement of the head/tank unit. Thereby the recording liquid within the supply line 99 is subjected to a centrifugal force and therefore there is produced a pump action to feed the ink to the subsidiary tank 89. As a result, an effective supply of ink to the subsidiary tank 89 from the main tank 97 is accomplished during printing by which the ink in the subsidiary tank is consumed.

According to the above embodiment, no particular limitation is imposed on the positional relation between the main tank 97 and recording head 88 and therefore it is allowed to position the bottom surface of the main tank 97 at a level lower than that of the subsidiary tank 89. The thing required at this time is only that the positional relation between the recording head and the bottom surface level of the subsidiary tank should be suitably selected considering the ink suction force by the surface tension at the recording head.

Hitherto, the space between platen and rolled paper charge part has been considered as a dead space in which no main tank is allowed to locate. Contrary to the common knowledge in the art, according to the above embodiment, the dead space can be used to receive a main tank. This makes it possible to provide an ink jet recording apparatus which is thinner in form and more compact in structure than the apparatus according to the prior art.

While the invention has been particularly shown and described with reference to preferred embodiments thereof, it will be understood by those skilled in the art that the foregoing and other changes in form and details can be made therein without departing from the spirit and scope of the invention.

What we claim is:

1. An ink jet recording apparatus comprising:

a printer unit including a recording head for jetting a recording liquid in response to an electrical signal, a subsidiary container for supplying the recording liquid to said recording head and a reciprocally movable carriage carrying thereon said recording head and said subsidiary container;

supporting means for supporting said printer unit in said recording apparatus;

a flexible supply line having one end connected to said subsidiary container and having the other end connected to a tank connection part fixed to said recording apparatus, said supply line being swingably movable with respect to the reciprocal movement of said carriage to produce a pressure which acts to supply recording liquid to said subsidiary container; and a flat shaped main container for holding recording liquid is removably connected to the tank connection part, wherein when said main container is in its connected state it is disposed under said supporting means.

2. An ink jet recording apparatus according to claim 1, wherein said main container is made of a flexible material.

3. An ink jet recording apparatus according to claim 2, wherein said main container is made of a film comprising a high molecular film layer and an metallic film layer covering said high molecular film layer.

4. An ink jet recording apparatus according to claim 2 or 3, wherein said main container is encased in a thin shaped casing to form a recording liquid cassette having a recording liquid outlet through which said cassette is removably connected to said supply line.

5. An ink jet recording apparatus comprising:

a printer unit including a recording head for jetting a recording liquid toward a platen holding a paper in response to an electrical signal; a subsidiary container for supplying the recording liquid to said recording head; and a reciprocally movable carriage carrying thereon said recording head and subsidiary container;

supporting means for supporting said printer unit in said recording apparatus;

a connection part fixed to said recording apparatus;

a flexible supply line having one end connected to said subsidiary container and the other end connected to one end of said connection part, said supply line being swingably movable with respect to the reciprocating movement of said carriage to produce a pressure which acts to supply recording liquid to said subsidiary container; and a flat shaped main container for holding recording liquid removably connected to the other end of said connection part, wherein said main container is in its connected state it is disposed under said supporting means, and when it detaches it detaches in a direction defined as from said recording head to said platen.

6. An ink jet recording apparatus according to claim 5, wherein said connection part at the other end thereof comprises a needle which connects to said main container.

7. An ink jet recording apparatus according to claim 5 or claim 6, wherein said main container is made of flexible material and is encased in a thin shaped casing to form a recording liquid cassette, said cassette is removably connected to said connection part.

* * * * *

UNITED STATES PATENT AND TRADEMARK OFFICE

CERTIFICATE OF CORRECTION

PATENT NO. : 4,429,320

DATED : January 31, 1984

INVENTOR(S) : Yoshihumi Hattori; Koji Terasawa; Yukio Kasugayama

It is certified that error appears in the above-identified patent and that said Letters Patent is hereby corrected as shown below:

| COL. | LINE | |
|---|---|---|
| 6 | 2 | Change "in" (first occurrence) to --as--. |
| 6 | 29 | Change "carrys" to --carries--. |
| 7 | 10 | Change "an" to --a--. |
| 11 | 26 | Change "an" to --a--. |
| 12 | 20 | After "wherein" add --when--. |

Signed and Sealed this

*Twenty-first* Day of *August 1984*

[SEAL]

*Attest:*

GERALD J. MOSSINGHOFF

*Attesting Officer* *Commissioner of Patents and Trademarks*